(12) United States Patent
Ohashi et al.

(10) Patent No.: US 10,407,125 B2
(45) Date of Patent: Sep. 10, 2019

(54) ELECTRIC VEHICLE

(71) Applicant: YAMAHA HATSUDOKI KABUSHIKI KAISHA, Iwata-shi, Shizuoka (JP)

(72) Inventors: Toru Ohashi, Shizuoka (JP); Yutaka Saruwatari, Shizuoka (JP); Hiroki Ozawa, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 196 days.

(21) Appl. No.: 15/086,105

(22) Filed: Mar. 31, 2016

(65) Prior Publication Data

US 2016/0297499 A1 Oct. 13, 2016

(30) Foreign Application Priority Data

Apr. 7, 2015 (JP) .................................. 2015-078694

(51) Int. Cl.
*B62M 6/45* (2010.01)
*B62M 6/55* (2010.01)
(Continued)

(52) U.S. Cl.
CPC ............. *B62M 6/45* (2013.01); *B60K 35/00* (2013.01); *B62K 23/04* (2013.01); *B62M 6/55* (2013.01); *B62K 2204/00* (2013.01)

(58) Field of Classification Search
CPC ........... B60K 35/00; B62K 23/04; B62M 6/55
(Continued)

(56) References Cited

U.S. PATENT DOCUMENTS

| 5,664,636 A * | 9/1997 | Ikuma | B62M 6/45 180/206.1 |
| 6,684,971 B2 * | 2/2004 | Yu | B62M 6/45 180/206.2 |

(Continued)

FOREIGN PATENT DOCUMENTS

| JP | 09-263290 A | 10/1997 |
| JP | 09-286374 A | 11/1997 |

(Continued)

OTHER PUBLICATIONS

Official Communication issued in corresponding European Patent Application No. 16164021.4, dated Sep. 13, 2016.

*Primary Examiner* — Maceeh Anwari
(74) *Attorney, Agent, or Firm* — Keating & Bennett, LLP (57) ABSTRACT

An electric vehicle includes a vehicle body, an electric motor, a wheel, an operator operated by a user to drive the wheel to rotate by power from the electric motor, and a controller that controls the electric motor according to an operation of the operator. The controller includes a plurality of control states including a basic state, a drive-standby state which transitions to and from the basic state, and a driving state which transitions to and from the drive-standby state and causes transmission of power of the electric motor to the wheel. The controller is configured or programmed to transition to the driving state if the operator is operated in the drive-standby state and to transition to the basic state if it is judged in the drive-standby state that a user is not present in the vicinity of the vehicle body for a predetermined time or longer.

9 Claims, 5 Drawing Sheets (51) Int. Cl.
*B60K 35/00* (2006.01)
*B62K 23/04* (2006.01)

(58) Field of Classification Search
USPC .......................................................... 701/22
See application file for complete search history.

(56) References Cited

U.S. PATENT DOCUMENTS

| | | |
|---|---|---|
| 2010/0033315 A1 | 2/2010 | Kamen et al. |
| 2012/0203407 A1* | 8/2012 | Hatanaka ............ B60L 15/2063 701/22 |
| 2013/0231810 A1* | 9/2013 | Garcia .................... B62M 6/45 701/22 |

FOREIGN PATENT DOCUMENTS

| | | |
|---|---|---|
| JP | 2000-050418 A | 2/2000 |
| JP | 2000-095179 A | 4/2000 |
| JP | 2000-095180 A | 4/2000 |
| JP | 2000-168672 A | 6/2000 |
| WO | 2012/017335 A1 | 2/2012 |
| WO | 2013/124764 A1 | 8/2013 |
| WO | 2015/039132 A1 | 3/2015 |

\* cited by examiner

ELECTRIC VEHICLE

BACKGROUND OF THE INVENTION

1. Field of the Invention

The present invention relates to an electric vehicle that transmits power from an electric motor to a wheel.

2. Description of the Related Art

Japanese Patent Application Publication No. 2000-095179 (JP 2000-095179A) discloses an electrically assisted bicycle. The electrically assisted bicycle includes a drive system driven by human power and a drive system driven by an electric motor. The electric motor assists the drive by human power and also assists driving of the vehicle during walking while pushing the same. A handle bar includes a walking-while-pushing switch attached thereto that is operated to be turned on and off. When a user turns on the walking-while-pushing switch and rotates a grip, the electric motor generates a walking-while-pushing assist force according to a rotation amount of the grip.

SUMMARY OF THE INVENTION

The inventor of preferred embodiments of the present invention described and claimed in the present application conducted an extensive study and research regarding an electric vehicle, such as the one described above, and in doing so, discovered and first recognized new unique challenges and previously unrecognized possibilities for improvements as described in greater detail below.

JP 2000-095179A (paragraph [0055] of JP 2000-095179A) includes a description of displaying an on/off state of a walking-while-pushing switch by an indicator lamp or the like. However, if a user overlooks the indication by the indicator lamp or the like, the user may fail to turn off the walking-while-pushing switch. In this case, the user may leave the vehicle with the walking-while-pushing switch remaining on.

In order to overcome the previously unrecognized and unsolved challenges described above, a preferred embodiment of the present invention provides an electric vehicle including a vehicle body, an electric motor provided in the vehicle body, a wheel provided in the vehicle body, an operator to be operated by a user to drive the wheel to rotate by power from the electric motor, and a controller that controls the electric motor according to an operation of the operator. The controller includes a plurality of control states including a basic state, a drive-standby state which is able to transition to and from the basic state, and a driving state which is able to transition to and from the drive-standby state and causes transmission of power from the electric motor to the wheel, and is configured or programmed to transition to the driving state when the operator is operated in the drive-standby state and to transition to the basic state if it is judged in the drive-standby state that a user is not present in the vicinity of the vehicle body for a predetermined time or longer.

If the operator is operated when the control state of the controller is in the drive-standby state, the control state of the controller transitions to the driving state, and the power of the electric motor is transmitted to the wheel. On the other hand, if it is judged that the user is away from the vicinity of the vehicle body for the predetermined time or longer in the drive-standby state, the control state of the controller transitions to the basic state. From the basic state, the control state cannot transition to the driving state without going through the drive-standby state. Therefore, even when the operator is operated, the power of the electric motor is not immediately transmitted to the wheel.

When the user is away from the vicinity (for example, a range in which the user him/herself is able to operate the operator) of the vehicle body for the predetermined time or longer, the control state automatically transitions to a state in which the power of the electric motor is not immediately transmitted even when the operator is operated, i.e., the basic state. Accordingly, the vehicle is never left in a state of being able to be immediately driven by the power of the electric motor. On the other hand, if the user is in the vicinity of the vehicle body, because the drive-standby state is maintained, the power of the electric motor is able to be immediately transmitted to the wheel to drive the vehicle by an operation of the operator.

An electric vehicle capable of appropriately generating a driving force reflecting a user's intention is thus provided.

In a preferred embodiment of the present invention, the controller is configured or programmed to transition to the drive-standby state when the operator is operated in the basic state. According to this arrangement, when the operator is operated in the basic state, the control state transitions to the drive-standby state, and when the operator is operated after the transition, it transitions to the driving state. Moreover, in the drive-standby state, if the user is away from the vicinity of the vehicle body for the predetermined time or longer, the control state automatically transitions to the basic state. Therefore, in a situation where the user is not present in the vicinity of the vehicle body, because the control state automatically becomes the basic state, the vehicle is never immediately driven even when the operator is operated.

In a preferred embodiment of the present invention, the controller is configured or programmed so as to be kept in the driving state when the operator is being operated, and transitions to the drive-standby state if a non-operation of the operator is detected in the driving state.

With this arrangement, the control state transitions to the driving state when the operator is operated in the drive-standby state, and thereafter, for a period of time where the operator is being operated, it is kept in the driving state, and the vehicle is driven. When the user cancels the operation of the operator, the control state transitions to the drive-standby state, and the drive of the vehicle is stopped. Accordingly, when the operator has not been operated, the control state becomes the drive-standby state, and further when the user is away from the vicinity of the vehicle body for the predetermined time or longer, it automatically transitions to the basic state.

In a preferred embodiment of the present invention, the controller is configured or programmed so as to judge, if a non-operation of the operator continues for the predetermined time or longer, that a user is not in the vicinity of the vehicle body for the predetermined time or longer. According to this arrangement, because absence of the user is detected by a non-operation of the operator, it is not necessary to provide a special detector to detect absence of the user.

In a preferred embodiment of the present invention, the electric vehicle further includes a user detector that detects whether a user is present in the vicinity of the vehicle body, in which the controller is configured or programmed to judge, if a state in which the user detector has not detected a user and there is no operation input to the operator continues for the predetermined time or longer, that a user is not in the vicinity of the vehicle body for the predetermined time or longer.

According to this arrangement, because absence of the user is able to be judged using the user detector in addition to the non-operation of the operator, whether the user is present in the vicinity of the vehicle body is reliably judged. Because the control state of the controller is appropriately caused to transition, the generation of a driving force is controlled in a manner appropriately reflecting a user's intention.

In a preferred embodiment of the present invention, the user detector includes a vehicle speed detector that detects whether the electric vehicle is running. Accordingly, if a state in which the operator has not been operated and the vehicle is at a standstill continues for the predetermined time or longer, the control state of the controller automatically transitions from the drive-standby state to the basic state.

In a preferred embodiment of the present invention, the electric vehicle further includes a human power drive system on the vehicle body and that transmits human power input by a user to the wheel, in which the user detector includes a human power input detector that detects an input of human power to the human power drive system.

According to this arrangement, an input to the human power input system is detected by the human power input detector, and it is judged based on its detection result whether the user is present in the vicinity of the vehicle body. Accordingly, a more reliable judgment becomes possible, and a driving force is appropriately generated based on a user's intention.

In a preferred embodiment of the present invention, the electric vehicle further includes an informer that informs the drive-standby state to a user. According to this arrangement, due to the drive-standby state being informed to the user, the user is able to recognize that a driving force is generated due to a transition to the driving state by an operation of the operator. Also, because the user knows, based on an informing state of the informer, that it is not in the drive-standby state, the user is able to perform an appropriate operation with the recognition of the control state.

In a preferred embodiment of the present invention, the informer includes a display supported on the vehicle body. According to this arrangement, the drive-standby state is informed to the user via the display. Informing by the display is particularly effective when the user is present in the vicinity (for example, a range in which a display of the display unit is visible) of the vehicle body. When the user is away from the vicinity of the vehicle body, because the control state automatically transitions from the drive-standby state to the basic state, the necessity for informing is low in a situation where the user is away from the vicinity of the vehicle body. Therefore, informing by the display unit is appropriate and sufficient.

In a preferred embodiment of the present invention, the vehicle body is preferably a saddle type vehicle body on which a user rides in a straddling manner. In this case, a saddle type vehicle is provided. A driving force of the electric motor is able to be transmitted to the wheel when the user is riding on the saddle type vehicle. Also, a driving force of the electric motor is able to be transmitted to the wheel when the user is walking while pushing the saddle type vehicle.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
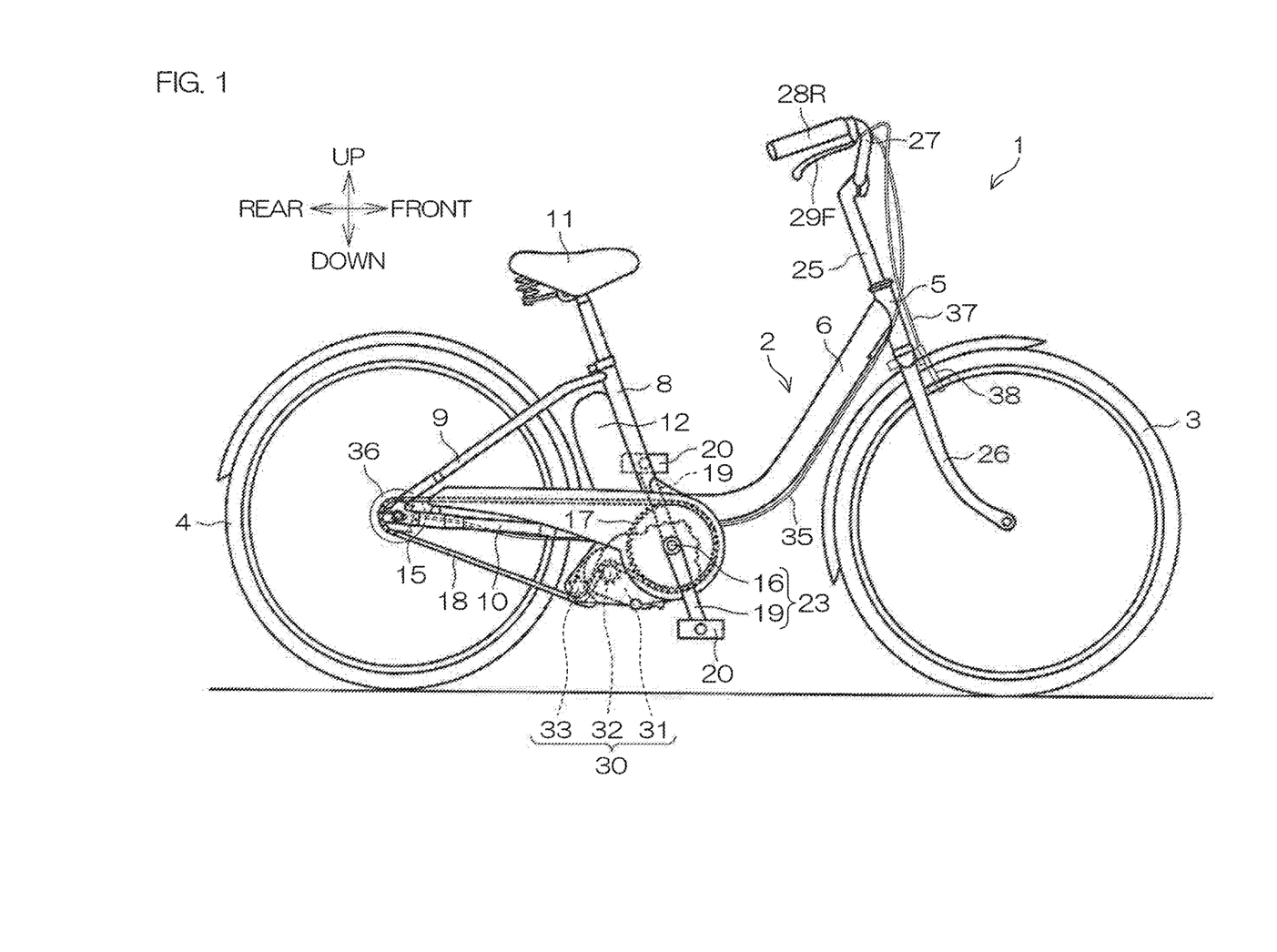
FIG. 1 is a side view for describing a configuration of a two-wheeled electric vehicle according to a preferred embodiment of the present invention.

FIG. 1 is a side view for describing a configuration of a two-wheeled electric vehicle that is an example of an electric vehicle according to a preferred embodiment of the present invention. In the following description, the directions of front/rear and left/right refer to directions as viewed from a user seated on a saddle. That is, in FIG. 1, a right side surface of the two-wheeled electric vehicle 1 is presented.

The two-wheeled electric vehicle 1 is an electric vehicle provided with an arrangement to transmit a driving force from an electric motor to a wheel, and more specifically, is a saddle type electric vehicle. The two-wheeled electric vehicle 1 includes a front wheel 3 and a rear wheel 4. Further, the two-wheeled electric vehicle 1 includes a human power drive system to drive the rear wheel 4 by human power.

The two-wheeled electric vehicle 1 includes a vehicle body frame 2 that defines a vehicle body of a saddle type. The front wheel 3 and the rear wheel 4 are attached to the vehicle body frame 2. The vehicle body frame 2 includes a head pipe 5, a main pipe 6, a seat pipe 8, a pair of left and right rear pipes 9, and a pair of left and right lower pipes 10. The main pipe 6 extends obliquely downward and rearward from the head pipe 5. The seat pipe 8 extends upward from a rear end portion of the main pipe 6. A saddle (seat) 11 is attached to an upper end portion of the seat pipe 8. Under the saddle 11, a battery 12 is attached to a rear side of the seat pipe 8.

The pair of rear pipes 9 are provided parallel or substantially parallel to each other, and extend rearward and obliquely downward from the upper end portion of the seat pipe 8. On the other hand, the pair of lower pipes 10 are provided parallel or substantially parallel to each other, and extend rearward from the rear end portion of the main pipe 6 horizontally or substantially horizontally. Rear end portions of the pair of rear pipes 9 and rear end portions of the pair of lower pipes 10 are respectively coupled with each other. A rear wheel sprocket 15 and the rear wheel 4 are freely rotatably attached to the coupling of the rear pipes 9 and the lower pipes 10.

A drive unit 30 is preferably disposed under or near the coupling of the main pipe 6, the seat pipe 8, and the lower pipes 10. The drive unit 30 is supported on the main pipe 6 and the lower pipes 10. A crankshaft 16 is freely rotatably supported in the drive unit 30, and extends horizontally to the left and right. A drive sprocket 17 is attached to the crankshaft 16. An endless chain 18 is wound around the drive sprocket 17 and the rear wheel sprocket 15. A rotation of the crankshaft 16 is therefore transmitted from the drive sprocket 17 via the chain 18 to the rear wheel sprocket 15. A pair of crank arms 19 are respectively attached to both end portions of the crankshaft 16. The crankshaft 16 and the pair of crank arms 19 define a crank 23. A pair of pedals 20 are respectively attached to the pair of crank arms 19. Due to a driver operating the pedals 20, the crankshaft 16 is rotated, which enables driving the rear wheel 4 by human power.

The drive unit 30 includes, besides the crankshaft 16, an electric motor 31, a motor drive sprocket 32 coupled to a drive shaft of the electric motor 31, and a tension sprocket 33 that applies tension to the chain 18 while rotating following the chain 18. Between the drive sprocket 17 and the rear wheel sprocket 15, the motor drive sprocket 32 is engaged with the lower-side chain 18 from the outside (from below) of the chain 18. Between the motor drive sprocket 32 and the rear wheel sprocket 15, the tension sprocket 33 is engaged with the lower-side chain 18 from the inside (from above) of the chain 18. The tension sprocket 33 is located lower than the motor drive sprocket 32, and applies tension to the chain 18.

Due to this arrangement, when the electric motor 31 is driven, its driving force is transmitted to the chain 18, and the driving force is further transmitted from the chain 18 to the rear wheel 4. Accordingly, the two-wheeled electric vehicle 1 is driven by the driving force of the electric motor 31. The rear wheel 4 is a wheel that is driven to rotate by power from the electric motor 31.

A steering shaft 25 is freely rotatably inserted into the head pipe 5. To a lower end portion of the steering shaft 25, a pair of front forks 26 are attached parallel or substantially parallel to each other. The front wheel 3 is freely rotatably attached to lower end portions of the pair of front forks 26. A handle bar 27 is attached to the upper end of the steering shaft 25.

Figure 2:
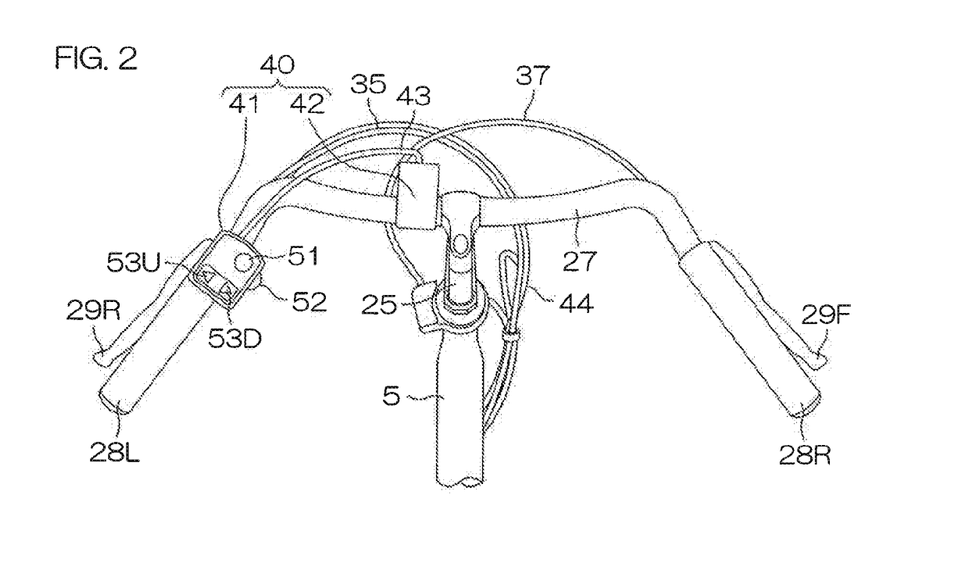
FIG. 2 is a plan view of a proximity of a handle bar of the two-wheeled electric vehicle.

FIG. 2 is a plan view of a proximity of the handle bar 27. The handle bar 27 extends substantially horizontally, and includes a pair of left and right grips 28L and 28R that are respectively grasped by the left hand and right hand of the driver. Due to the driver operating the handle bar 27 to turn to the left and right, the steering shaft 25 turns about an axis center of the head pipe 5, and in accordance therewith, the front forks 26 and the front wheel 3 integrally turn to the left and right. The two-wheeled electric vehicle 1 is thus steered.

Near the left and right grips 28L and 28R, a rear wheel brake lever 29R and a front wheel brake lever 29F are disposed, respectively, and coupled to the handle bar 27. When the driver operates the rear wheel brake lever 29R, its operating force is transmitted to a rear wheel brake unit 36 (refer to FIG. 1) via a rear wheel brake wire 35. The rear wheel brake unit 36 is a braking device that is disposed near an axle of the rear wheel 4 to apply a braking force to the rear wheel 4. The rear wheel brake unit 36 may be a roller brake unit. When the driver operates the front wheel brake lever 29F, its operating force is transmitted to a front wheel brake unit 38 (refer to FIG. 1) via a front wheel brake wire 37. The front wheel brake unit 38 is a braking device that is attached to an upper end portion of the front forks 26 and applies a braking force to the front wheel 3. The front wheel brake unit 38 may be a caliper brake unit.

Figure 3:
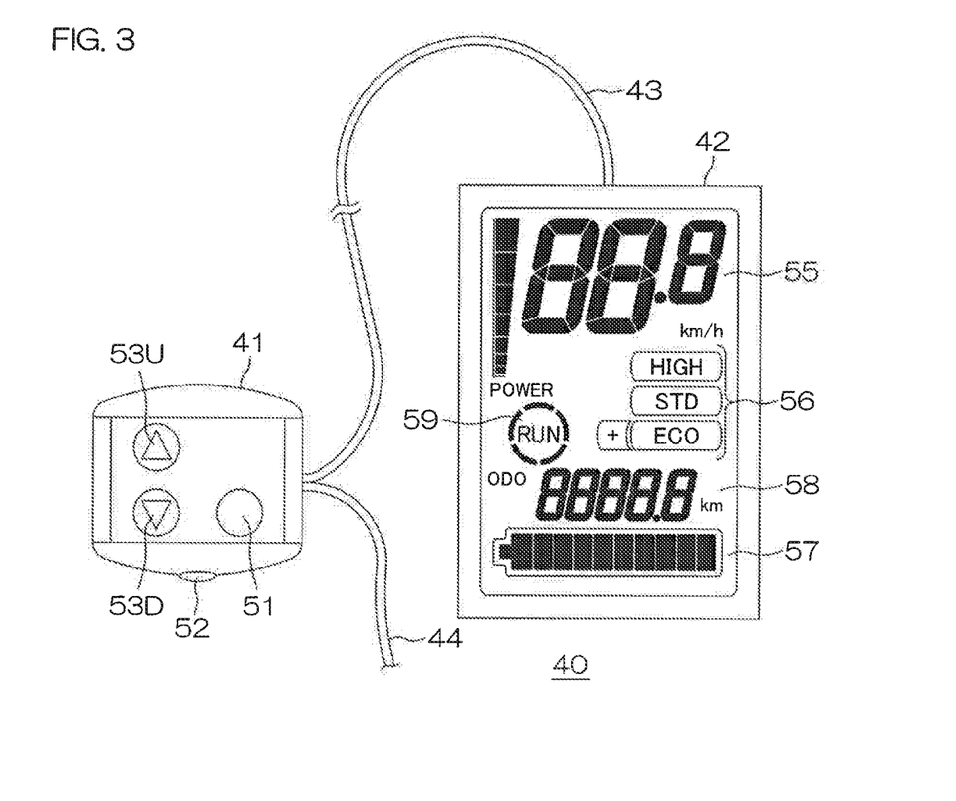
FIG. 3 is a plan view showing a configuration example of a remote controller attached to the handle bar.

FIG. 3 is a plan view showing an example of a remote controller 40 attached to the handle bar 27. The remote controller 40 includes a switch unit 41 and a display unit 42. The switch unit 41 and the display unit 42 are connected via a cable 43. Also, the switch unit 41 is connected, via a cable 44, to a controller 70 (refer to FIG. 4) provided in the drive unit 30.

The switch unit 41 includes a power switch 51, a self-propelling switch 52, and a running mode changeover switch 53U and 53D. The power switch 51 is an operation switch that is operated by a user to power on the drive unit 30 and the remote controller 40 and power off the same.

The self-propelling switch 52 is an operation switch that is operated to run the two-wheeled electric vehicle 1 by a driving force of the electric motor 31 when a user is seated on the saddle 11. That is, the self-propelling switch 52 is a switch that is operated by a user to drive (self-propel) the two-wheeled electric vehicle 1 by a driving force of the electric motor 31 without imparting a pedal force to the pedals 20. The self-propelling switch 52 is an example of an operator in a preferred embodiment of the present invention.

The running mode changeover switch 53U and 53D is an operation switch that, when a user is applying a pedal force to the pedals 20 to run the two-wheeled electric vehicle 1, causes the user to adjust the magnitude of an assist force to be generated from the drive unit 30. The running mode changeover switch includes an assist-up switch 53U to increase the assist force and an assist-down switch 53D to reduce the assist force.

The display unit 42 is, for example, a two-dimensional display device such as a liquid crystal display panel. The display unit 42 includes a display screen that includes a vehicle speed display 55, a running mode display 56, a remaining battery level display 57, a mileage display 58, a state display 59, etc.

The running mode display 56 displays running modes that are selected by operation of the running mode changeover switch 53U and 53D. In the present preferred embodiment, any of a standard assist state (STD), a strong assist state (HIGH), a weak assist state (ECO), and a non-assist state are able to be selected as a running mode by operation of the running mode changeover switch 53U and 53D.

The state display 59 displays whether a state (self-propellable state) in which a driving force is generated by operation of the self-propelling switch 52, and informs this fact to the user. The self-propellable state in which a driving force is generated by operation of the self-propelling switch 52 may be, for example, a character display such as "RUN" or "READY."

The vehicle speed display 55 displays a running speed of the two-wheeled electric vehicle 1. The remaining battery level display 57 displays a remaining capacity of the battery 12. The mileage display 58 displays a distance that the two-wheeled electric vehicle 1 has run.

The display unit 42 may be arranged so as to be freely attachable and detachable with respect to a base 45 with a terminal (refer to FIG. 4) to be fixed to the handle bar 27.

Figure 4:
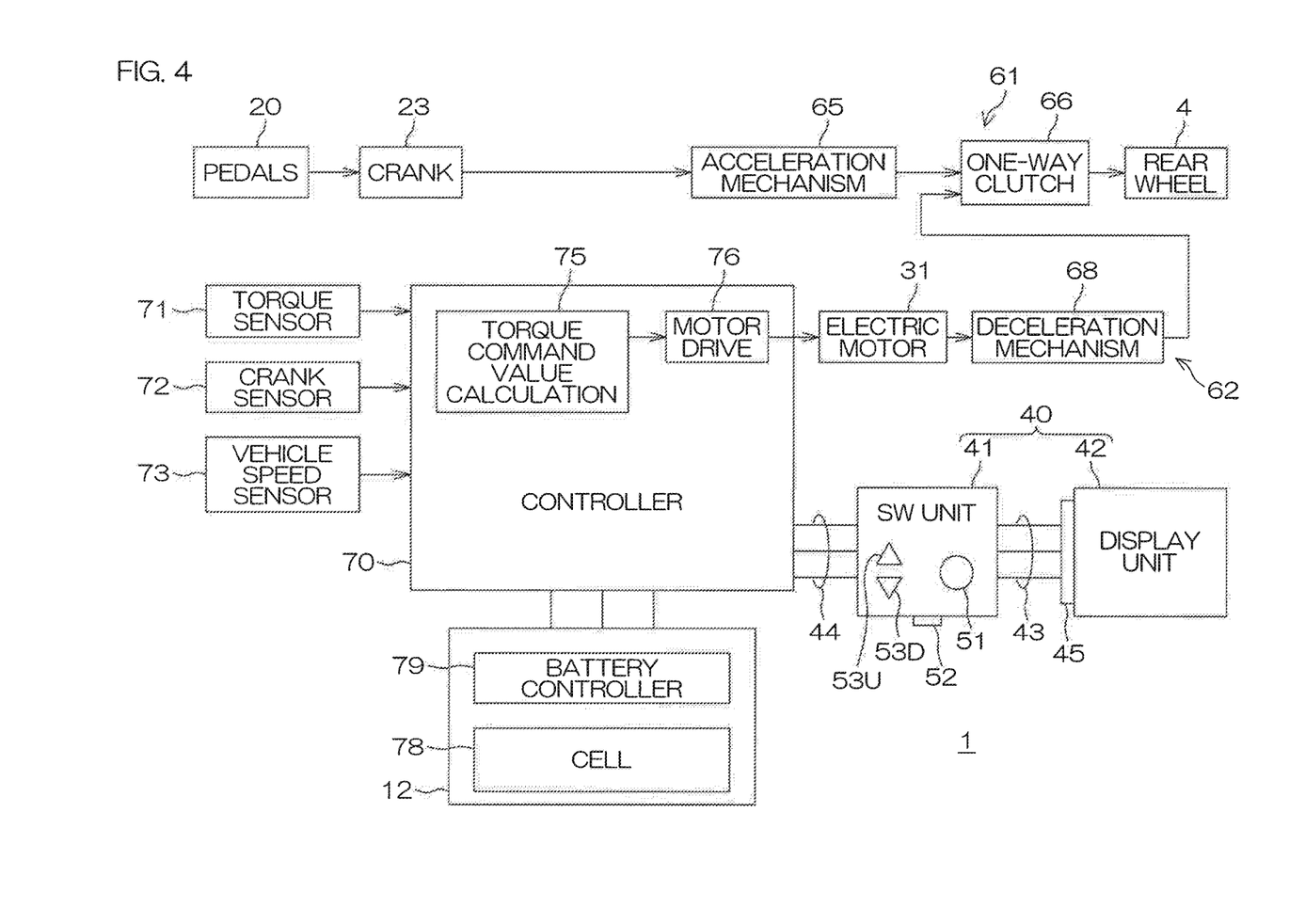
FIG. 4 is a block diagram for describing a configuration of a control system of the two-wheeled electric vehicle.

FIG. 4 is a block diagram for describing a configuration of a control system of the two-wheeled electric vehicle 1. The two-wheeled electric vehicle 1 includes a human power drive system 61 that shifts a pedal force applied to the pedals 20 by a driver (user) at a predetermined gear shift ratio to be supplied to the rear wheel 4, and an electromotive drive system 62 that supplies a driving force of the electric motor 31 to the rear wheel 4.

The human power drive system 61 includes the crank 23 that rotates due to a pedal force applied to the pedals 20, an acceleration mechanism 65, and a one-way clutch 66. The acceleration mechanism 65 includes the drive sprocket 17, the chain 18, and the rear wheel sprocket 15. The rotation of the crank 23 is accelerated according to a gear ratio between the drive sprocket 17 and the rear wheel sprocket 15. The one-way clutch 66 transmits a rotating force in one direction (forward drive direction) of the rear wheel sprocket 15 to the rear wheel 4, and does not transmit a rotating force in the other direction (reverse drive direction). Therefore, a rotating force in the forward drive direction (human power torque) applied to the crank 23 is accelerated by the acceleration mechanism 65, and is then transmitted to the rear wheel 4 via the one-way clutch 66.

The electromotive drive system 62 drives the electric motor 31 according to output of a torque sensor 71, a crank sensor 72, and a vehicle speed sensor 73. Also, the electromotive drive system 62 drives the electric motor 31 according to operation of the self-propelling switch 52.

The torque sensor 71 detects torque (a pedal force) applied to the crank 23, and outputs a torque signal according to the torque. The crank sensor 72 detects a rotation angle of the crank 23, and outputs a rotation angle signal representing the rotation angle. The torque sensor 71 and the crank sensor 72 are examples of a human power input detector that detects an input of a user's human power. The vehicle speed sensor 73 detects a speed of the two-wheeled electric vehicle 1, and outputs a vehicle speed signal representing the speed. The vehicle speed sensor 73 is preferably a sensor that detects a rotation speed of the front wheel 3 or the rear wheel 4 (wheel speed). The vehicle speed sensor 73 is an example of a vehicle speed detector that detects whether the two-wheeled electric vehicle 1 is running.

The electromotive drive system 62 includes the electric motor 31, a deceleration mechanism 68, and the controller 70 (motor controller). The controller 70 drives the electric motor 31 according to output signals of the remote controller 40, the torque sensor 71, the crank sensor 72, and the vehicle speed sensor 73. A rotation of the electric motor 31 is decelerated by the deceleration mechanism 68, and then transmitted to the rear wheel 4 via the one-way clutch 66. The deceleration mechanism 68 includes the motor drive sprocket 32, the chain 18, and the rear wheel sprocket 15.

The controller 70 includes a torque command value calculator 75. More specifically, the controller 70 includes a microcomputer, and is programmed so as to perform a plurality of functions. The plurality of functions include a function as the torque command value calculator 75.

The torque command value calculator 75 calculates a torque command value according to output signals of the remote controller 40, the torque sensor 71, the crank sensor 72, and the vehicle speed sensor 73. A motor drive unit 76 is controlled in view of the torque command value. The motor drive unit 76 includes a drive circuit that supplies current to the electric motor 31 according to the torque command value.

The torque command value is a command value for a drive torque that needs to be generated by the electric motor 31. The motor drive unit 76 PWM (pulse width modulation) controls a drive voltage from the battery 12 at a duty ratio corresponding to a torque command value. The PWM controlled drive voltage is applied to the electric motor 31. A drive current corresponding to the torque command value thus flows to the electric motor 31.

The battery 12 includes a cell 78 and a battery controller 79. A current generated by the cell 78 is supplied to the electric motor 31 via the controller 70. Also, the controller 70 and the remote controller 40 operate by electric power supplied from the cell 78. The battery controller 79 communicates with the controller 70 to transmit information such as the remaining battery level to the controller 70.

The remote controller 40 operates by electric power supplied from the battery 12 via the controller 70. The switch unit 41 is connected to the controller 70 via the cable 44, and the display unit 42 is connected to the switch unit 41 via the cable 43. The controller 70 communicates with the switch unit 41 and the display unit 42. The controller 70 receives a command signal from the switch unit 41 and provides a display control signal to the display unit 42. The display unit 42 is connected to the cable 43 via the base 45 with a terminal. The display unit 42 is freely attachable and detachable with respect to the base 45 with a terminal.

Figure 5:
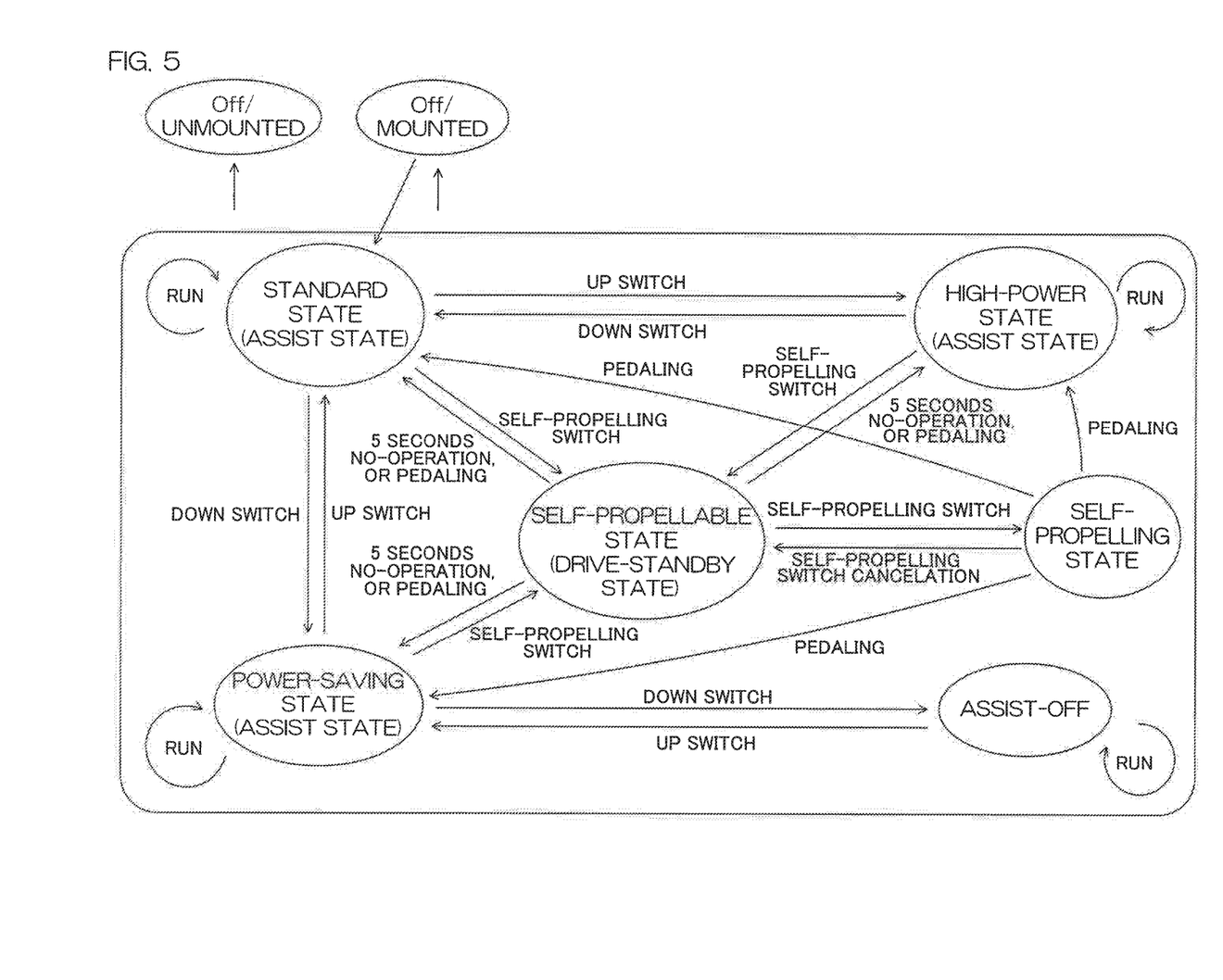
FIG. 5 is a state transition diagram for describing control state transitions of a controller of the two-wheeled electric vehicle.

FIG. 5 is a state transition diagram for describing control state transitions of the controller 70. The controller 70 is able to perform a plurality of control states. The control state of the controller 70 is represented by, for example, a state variable kept by the controller 70 internally. The controller 70 executes different contents of control according to the control state, i.e., a state variable value.

More specifically, the controller 70 is able to perform the following plurality of control states.

Off/Unmounted state: A state in which the display unit 42 has not been mounted on the base 45 with a terminal and has therefore been disconnected, and a state in which the controller 70 has been powered off.

Off/Mounted state: A state in which the display unit 42 has been mounted on the base 45 with a terminal and has been connected to the controller 70, and the controller 70 has been powered off.

Standard state: A state in which the controller 70 is powered on, and a standard assist force based on a pedal force is generated from the electric motor 31. An initial state immediately after power-on.

High-power state: A strong assist state in which the controller 70 has been powered on, and an assist force greater than a standard assist force is generated from the electric motor 31 based on a pedal force.

Power-saving state: A weak assist state in which the controller 70 has been powered on, and an assist force smaller than a standard assist force is generated from the electric motor 31 based on a pedal force.

Self-propellable state: A drive-standby state in which a driving force is generated from the electric motor 31 by operation of the self-propelling switch 52.

Self-propelling state: A driving state in which the self-propelling switch 52 is being operated, and a driving force is being generated from the electric motor 31.

Assist-Off state: A non-assist state in which the controller 70 has been powered on, but a driving force is not generated from the electric motor 31.

If the controller 70 is powered on by the user operating the power switch 51 when the display unit 42 has been mounted, the control state transitions from the off/mounted state to the standard state, and the running mode becomes a standard assist state accordingly. Therefore, when the user pedals the pedals 20 to input human power, an assist force according thereto is generated from the electric motor 31. Also, the controller 70 causes a display of the standard assist state (STD) on the running mode display 56 of the display unit 42.

If the assist-up switch 53U is operated in the standard state, the control state transitions to the high-power state, and the running mode becomes a strong assist state accordingly. Therefore, an assist force generated by the electric motor 31 has a greater proportion with respect to a pedal force, and the electric motor 31 more strongly assists a pedal operation. The controller 70 causes a display of the strong assist state (HIGH) on the running mode display 56 of the display unit 42. When the assist-down switch 53D is operated in the high-power state, due to a transition to the standard state, the running mode becomes a standard assist state, and according thereto, the display of the running mode display 56 is also switched.

If the assist-down switch 53D is operated in the standard state, the control state transitions to the power-saving state, and the running mode becomes a weak assist state (ECO) accordingly. Therefore, an assist force generated by the electric motor 31 has a smaller proportion with respect to a pedal force, and assist by the electric motor 31 is weakened to achieve power saving. Also, the controller 70 causes a display of the weak assist state (ECO) on the running mode display 56 of the display unit 42. If the assist-down switch 53D is operated in the power-saving state, the control state transitions to the assist-Off state, and the running mode becomes a non-assist state accordingly, and the electric motor 31 is put into a standstill state. That is, it becomes a state in which a driving force entirely by human power is applied to the vehicle body. If the assist-up switch 53U is operated from the assist-Off state, the control state transitions to the power-saving state, and the running mode becomes a weak assist state (ECO) accordingly. The display of the running mode display 56 is switched according thereto. If the assist-up switch 53U is operated from the power-saving state, the control state transitions to the standard state, and the running mode becomes a standard assist state (STD) accordingly. The display of the running mode display 56 is switched according thereto.

If the self-propelling switch 52 is operated in any assist state of the standard state, the high-power state, and the power-saving state, the control state transitions to the self-propellable state (drive-standby state). The controller 70 thereupon displays "RUN," "READY," or the like on the state display 59 of the display unit 42 to inform the user that it has become the self-propellable state in which a driving force is generated by operation of the self-propelling switch 52.

In the self-propellable state, the electric motor 31 is not driven. When there has been no operation of the self-propelling switch 52 for a predetermined period of time (for, for example, five seconds) in the self-propellable state, the control state automatically returns to the assist state (basic state) before the transition. The automatic return to the basic state may be conditional only on the non-operation of the self-propelling switch 52, and another condition may further be judged (refer to FIG. 6 to be described below). Further, even before an elapse of the predetermined period of time, also when the torque sensor 71 or the crank sensor 72 detects a pedal operation in the self-propellable state, the control state automatically returns to the assist state (basic state) before the transition. After the return to the basic state, the self-propellable state display such as "RUN" or "READY" on the state display 59 is deleted.

If the self-propelling switch 52 is operated in the self-propellable state, the control state transitions to the self-propelling state (driving state), and the controller 70 drives the electric motor 31 based on a torque command value set for self-propelling. Due to this driving force, the two-wheeled electric vehicle 1 on which a driver is riding is caused to run. If the operation of the self-propelling switch 52 is canceled in the self-propelling state, the control state returns to the self-propellable state. That is, it becomes the self-propelling state only for a period of time when the self-propelling switch 52 is being operated, and the electric motor 31 generates a driving force. The controller 70 may detect a vehicle speed detected by the vehicle speed sensor 73 to drive the electric motor 31 such that the two-wheeled electric vehicle 1 runs in a vehicle speed range of not more than a predetermined upper limit vehicle speed. The upper limit vehicle speed may be set to, for example, a value within a range of 25 km/h to 45 km/h.

Also, if the torque sensor 71 or the crank sensor 72 detects a pedal operation in the self-propelling state, the control state transitions to the assist state (basic state) before the transition to the self-propellable state. This transition is a direct transition that is not via the self-propellable state. Therefore, when the pedals 20 are operated, an assist force according to the pedal force is immediately generated.

If the power switch 51 is operated when the power is on, from any state, due to a transition to the off/mounted state, the controller 70 is powered off. Also, also when a predetermined auto power-off condition is satisfied, from any state, the control state similarly transitions to the off/mounted state. The auto power-off condition may be, for example, a condition that an input from any of the torque sensor 71, the crank sensor 72, the vehicle speed sensor 73, the switch unit 41, etc., is not detected over a predetermined time (for example, 300 seconds).

Also, if the display unit 42 is detached from the base 45 with a terminal when the power is on, from any state, the control state transitions to the off/unmounted state, and the controller 70 is powered off.

Figure 6:
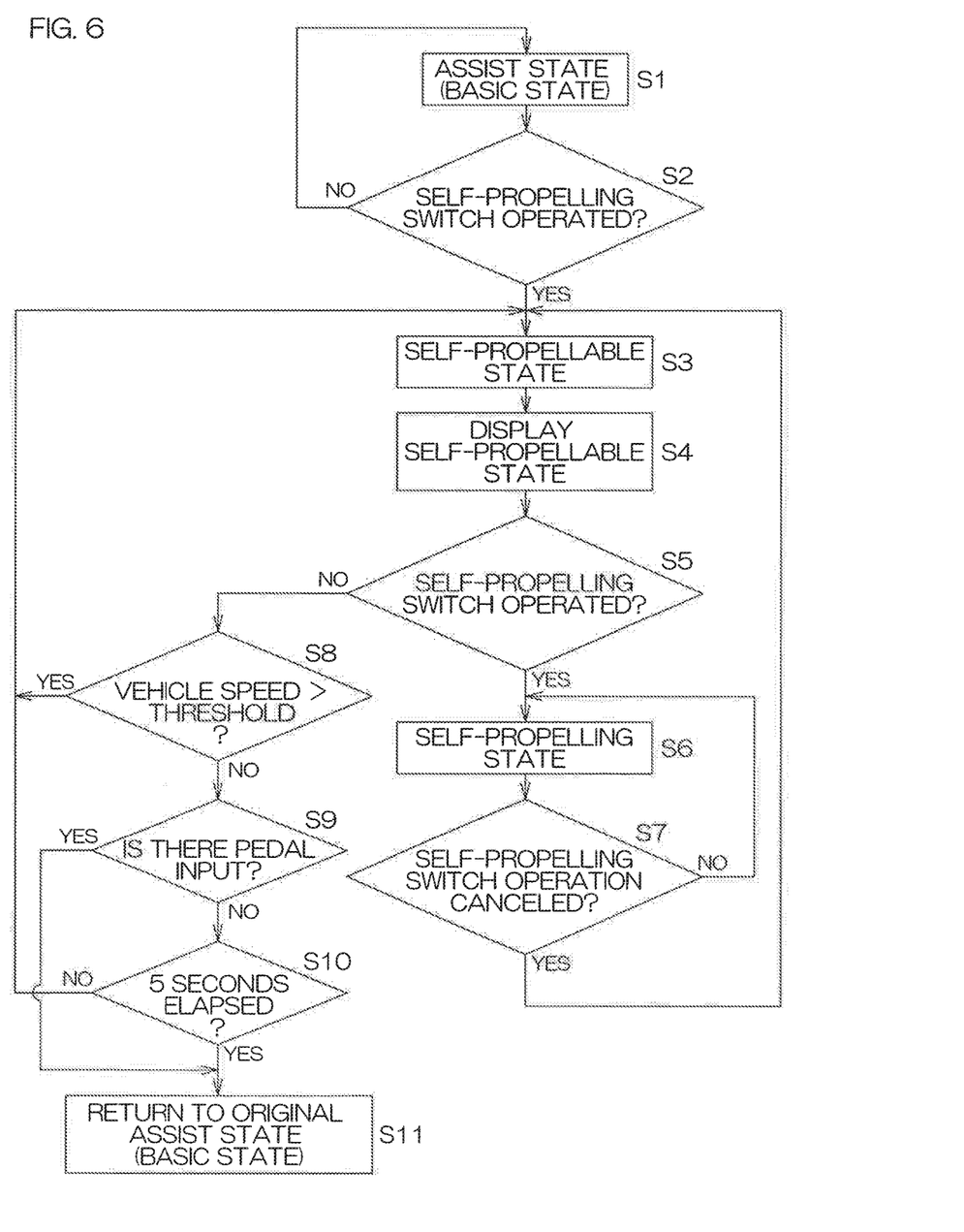
FIG. 6 is a flowchart for describing control state transitions of a controller related to operation of a self-propelling switch of the remote controller.

FIG. 6 is a flowchart for describing control state transitions of the controller 70 related to operation of the self-propelling switch 52. When the controller 70 is in any of the assist states, the current assist state is provided as a basic state. That is, the basic state is the standard state, the high-power state, or the power-saving state. From this basic state, when the self-propelling switch 52 is operated (step S2: YES), the controller 70 causes its control state to transition to the self-propellable state (step S3), and causes the display unit 42 to display that it is in the self-propellable state (step S4). In the present preferred embodiment, as shown in FIG. 3, being in the self-propellable state is displayed by the display of "RUN," and this fact is informed to the user.

The controller 70, in the self-propellable state, monitors whether there is an operation of the self-propelling switch 52 (step S5). When the self-propelling switch 52 is operated (step S5: YES), the controller 70 causes its control state to transition to the self-propelling state (step S6), and controls the motor drive unit 76 based on a preset torque command value for self-propelling. The electric motor 31 is thus driven, and its driving force is transmitted to the rear wheel 4.

The judgment of an operation of the self-propelling switch 52 in the self-propellable state (step S5) may include a judgment (first judgment) as to whether there is a new operation after an operation of the self-propelling switch 52 that served as the cause for a transition from the basic state to the self-propellable state is once canceled. In this case, by operating the self-propelling switch 52 twice from the basic state, the control state transitions to the self-propelling state through the self-propellable state. Also, the judgment of an operation of the self-propelling switch 52 in the self-propellable state (step S5) may include a judgment (second judgment) as to whether an operation of the self-propelling switch 52 that served as the cause for a transition from the basic state to the self-propellable state has continued for a predetermined period of time (for example, one second) or more. In this case, by pressing and holding operation of the self-propelling switch 52 from the basic state, the control state transitions to the self-propelling state through the self-propellable state. The judgment in step S5 preferably includes at least the above-described first judgment, and may include both the above-described first and second judgments. Performing both the first and second judgments causes a transition from the basic state through the self-propellable state to the self-propelling state by either of the two-time operation and pressing and holding operation of the self-propelling switch 52.

When the operation of the self-propelling switch 52 is canceled in the self-propelling state (step S7: YES), the controller 70 causes its control state to transition to the self-propellable state. That is, only for a period of time where the self-propelling switch 52 has been operated (step S7: NO), the electric motor 31 generates a driving force for self-propelling.

On the other hand, when an operation of the self-propelling switch 52 is not detected in the self-propellable state (step S5: NO), the controller 70 judges whether it has been in a state where the user is not in the vicinity of the two-wheeled electric vehicle 1 for a predetermined period of time (in the present preferred embodiment, for five seconds) or longer. Specifically, the controller 70 judges whether the self-propelling switch 52 is in a non-operated state (step S5). Also, the controller 70 judges whether a vehicle speed detected by the vehicle speed sensor 73 is above a predetermined running determination threshold (for example, 2 km/h) (step S8). That is, the controller 70 judges whether or not the two-wheeled electric vehicle 1 is running. Further, the controller 70 judges whether human power is being input from the pedals 20 with reference to an output of the torque sensor 71 or the crank sensor 72 (step S9). The controller 70 judges that the user is not in the vicinity of the two-wheeled electric vehicle 1 if the self-propelling switch 52 is in a non-operated state (step S5: NO), the vehicle speed is not more than the running determination threshold (step S8: NO), and there is no input of human power from the pedals 20 (step S9: NO). When this state continues for longer than a predetermined of time (for, for example, five seconds) (step S10: YES), the controller 70 judges that it is in a state where the user is not in the vicinity of the two-wheeled electric vehicle 1 for the predetermined period of time or longer, and causes the control state to transition to the original assist state (basic state) (step S11).

Even when the self-propelling switch 52 is in a non-operated state (step S5: NO), if the vehicle speed is above the running determination threshold (step S8: YES), the self-propellable state is maintained. Also, when a human power input from the pedals 20 is detected in the continuation of the self-propellable state (step S9: YES), the controller 70 causes its control state to immediately transition to the original assist state (basic state) through no judgment in step S10. Even when the self-propelling switch 52 is in a non-operated state (step S5: NO), the vehicle speed is not more than the running determination threshold (step S8: NO), and no human power input is detected (step S9: NO), if the state has not yet continued for the predetermined period of time or more (step S10: NO), the control state is maintained in the self-propellable state (step S3).

As described in the foregoing, according to the present preferred embodiment, if the self-propelling switch 52 is operated when the control state of the controller 70 is in the self-propellable state, the control state of the controller 70 transitions to the self-propelling state, and the power of the electric motor 31 is transmitted to the rear wheel 4. On the other hand, if it is judged that the user is away from the vicinity of the vehicle body for the predetermined period of time or longer in the self-propellable state, the control state of the controller 70 transitions to the original assist state (basic state) before the transition to the self-propellable state. In the present preferred embodiment, the control state transitions to the self-propellable state when the self-propelling switch 52 is operated in the assist state, and when the self-propelling switch 52 is operated after the transition, it transitions to the self-propelling state. Therefore, from the assist state (basic state), because the control state cannot transition to the self-propelling state without going through the self-propellable state, even when the self-propelling switch 52 is operated, the power of the electric motor 31 is not immediately transmitted to the rear wheel 4. That is, because a driving force is not generated in the assist state (basic state) even when the self-propelling switch 52 is operated, a driving force is not generated unless the user has a definite intention to generate a driving force.

When the user is away from the vicinity of the vehicle body for the predetermined time or longer, the control state automatically transitions to a state in which the power of the electric motor 31 is not immediately transmitted even when the self-propelling switch 52 is operated, i.e., the assist state. Accordingly, the two-wheeled electric vehicle 1 is never left in a state where the electric motor 31 is immediately driven by operation of the self-propelling switch 52. On the other hand, if the user is in the vicinity of the vehicle body, because the self-propellable state is maintained, the power of the electric motor 31 is immediately transmitted to the rear wheel 4 to drive the two-wheeled electric vehicle 1 by an operation of the self-propelling switch 52. A two-wheeled electric vehicle 1 that is able to appropriately generate a driving force reflecting a user's intention is thus provided.

Also, in the present preferred embodiment, the control state transitions to the self-propelling state when the self-propelling switch 52 is operated in the self-propellable state, and thereafter, for a period of time when the self-propelling switch 52 is being operated, it is kept in the self-propelling state, and the electric motor 31 is driven. When the user cancels the operation of the self-propelling switch 52, the control state transitions to the self-propellable state, and the drive of the electric motor 31 is stopped. Accordingly, the control state becomes the self-propellable state when the operation of the self-propelling switch 52 is canceled, and further when the user is away from the vicinity of the vehicle body for the predetermined period of time or longer, it automatically transitions to the basic state. Accordingly, the two-wheeled electric vehicle 1 is never left in a state where a driving force of the electric motor 31 is immediately generated by operation of the self-propelling switch 52.

In the present preferred embodiment, the controller 70 judges that the user is not in the vicinity of the vehicle body for the predetermined period of time or longer on the condition that a non-operation of the self-propelling switch 52 continues for a predetermined period of time (for example, five seconds) or longer. Absence of the user is thus detected using a non-operation of the operator without providing a special detector.

Also, in the present preferred embodiment, the sensors to be used for drive control of the electric motor 31, i.e., the torque sensor 71, the crank sensor 72, and the vehicle speed sensor 73 are used as user detectors. More specifically, whether there is an input of human power to the pedals 20 is judged based on an output of the torque sensor 71 or the crank sensor 72, and it is thus detected whether the user is in the vicinity of the vehicle body. Also, whether the two-wheeled electric vehicle 1 is running is judged based on an output of the vehicle speed sensor 73, and it is detected based thereon whether the user is in the vicinity of the vehicle body. By monitoring in this manner the output of the sensors to be used for drive control of the electric motor 31 and the operation state of the self-propelling switch 52, absence of the user is reliably judged. Because the control state of the controller 70 is thus appropriately caused to transition, the generation of a driving force from the electric motor 31 is controlled in a manner appropriately reflecting a user's intention.

An automatic transition from the self-propellable state to the basic state is not a big problem even if such an automatic transition is caused by an erroneous judgment despite the user being present in the vicinity of the vehicle body. This is because a driving force is generated, without causing a large delay, based on a user's intention since the control state is promptly caused to transition to the self-propelling state through the self-propellable state by repeatedly operating the self-propelling switch 52 or continuing operating the same.

Also, in the present preferred embodiment, when the control state of the controller 70 is the self-propellable state, this fact is informed to the user by a display on the state display 59 of the display unit 42. The user thus recognizes that a driving force of the electric motor 31 is able to be transmitted to the rear wheel 4 by an operation of the self-propelling switch 52. Also, because the user can know, based on a display of the state display 59, that it is not in the self-propellable state as well, the user is able to perform an appropriate operation with the recognition of the current control state.

A display by the display unit 42 supported on the vehicle body is particularly effective when the user is present in the vicinity of the vehicle body. When the user is away from the vicinity of the vehicle body, because the control state of the controller 70 automatically transitions from the self-propellable state to the assist state (basic state), the necessity for informing is low in a situation where the user is away from the vicinity of the vehicle body. Therefore, informing by the display unit 42 is appropriate and sufficient.

As described above, by the user operating the self-propelling switch 52 when riding on the two-wheeled electric vehicle 1, the two-wheeled electric vehicle 1 is able to be self-propelled by a driving force of the electric motor 31 without applying a pedal force to the pedals 20.

Although preferred embodiments of the present invention have been described above, the present invention can be carried out in yet other modes as will be exemplified below.

In the preferred embodiments described above, not only the non-operation of the self-propelling switch 52 but also the condition relating to a vehicle speed (step S8) and the condition relating to input of a pedal force to the pedals 20 are judged to detect absence of the user. However, absence of the user may be judged based on only one or a combination of an arbitrary two of these three conditions. For example, it is possible to judge a user's absence based on only a non-operation of the self-propelling switch 52. Also, it may be judged that the user is absent if a state where the vehicle speed is zero continues for a predetermined period of time. Also, of the above-mentioned three conditions, two of the non-operation of the self-propelling switch 52 and the condition relating to a vehicle speed may be used, or two of the non-operation of the self-propelling switch 52 and the condition relating to a pedal force may be used. Also, a seating detector that detects whether a user is seated on the saddle 11 (seat) and/or a detector that detects whether a user is touching a handle (grip 28L, 28R) may function as a user detector. That is, when seating of the user has not been detected for a predetermined period of time or longer and/or when it has not been detected for a predetermined period of time or longer that the user is touching the handle, it may be judged that a user is not in the vicinity of the vehicle body. In a state where the user is not riding on the vehicle, the control state is thus caused to automatically transition from the self-propellable state to the assist state.

In the preferred embodiments described above, a description has been given of self-propelling when a driver is riding on the two-wheeled electric vehicle 1, but a walking-while-pushing mode may be provided that assumes a case where a user is mainly off the saddle 11 to walk while pushing the two-wheeled electric vehicle 1. Such a walking-while-pushing mode may be, for example, a running mode to generate from the electric motor 31 a driving force to run the two-wheeled electric vehicle 1 at a lower speed than when self-propelling.

The two-wheeled electric vehicle 1 may include a brake detector that detects actuation of the braking device (rear wheel brake unit 36, front wheel brake unit 38). In this case, the controller 70 may be configured or programmed so as to cancel the self-propelling state to transition to the self-propellable state, if the brake detector detects actuation of the braking device, even when the self-propelling switch 52 is being operated. The brake detector may be a brake switch that detects operation of the brake lever 29R, 29F serving as a brake operation member.

The brake detector may be provided as a user detector. That is, non-detection of a brake operation within a predetermined period of time may be provided as a condition for detecting a user's absence.

In place of the rear-wheel driving electric motor 31 or in addition thereto, a front-wheel driving electric motor to drive the front wheel 3 may be provided.

The switch unit 41 and the display unit 42 are not necessarily separated, and a single unit may define the remote controller 40 in which the switch unit 41 and the display unit 42 are integrally united.

The operator that generates a driving force of the electric motor 31 is not limited to the self-propelling switch 52 having a button shape. For example, either of the grips 28L and 28R may be provided as an accelerator grip that is turnable with respect to the handle bar 27, and the accelerator grip may be used as an operator. In that case, the torque command value to drive the electric motor 31 may be variable according to an operation amount of the accelerator grip. Besides above, an operator in an arbitrary form such as a lever shape may be used.

In the preferred embodiments described above, the self-propellable state preferably is informed by a display of the state display 59 of the display unit 42. However, informing of the self-propellable state may be performed by an optical signal generated by an LED or the like, or may be performed by an auditory signal generated by a buzzer or the like.

The vehicle to which various preferred embodiments of the present invention are applied may be a two-wheeled electric vehicle without pedals. Also, various preferred embodiments of the present invention may be applied to a saddle type electric vehicle other than two-wheeled vehicles and further to an electric vehicle other than saddle types. For example, various preferred embodiments of the present invention may be applied to an ATV (All Terrain Vehicle), which is an example of a saddle type vehicle with a plurality of front wheels or rear wheels.

The present application claims priority to Japanese Patent Application No. 2015-078694 filed in the Japan Patent Office on Apr. 7, 2015, and the entire disclosure of the application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric vehicle comprising:
   a vehicle body;
   an electric motor provided in the vehicle body;
   a wheel provided in the vehicle body;
   an operator to be operated by a user to drive the wheel to rotate by power from the electric motor; and
   a controller that controls the electric motor according to an operation of the operator; wherein
   the controller includes a plurality of control states including a basic state, a drive-standby state which transitions to and from the basic state, and a driving state which transitions to and from the drive-standby state and causes transmission of the power of the electric motor to the wheel;
   the controller is configured or programmed to transition to the driving state when the operator is operated in the drive-standby state, and to transition to the basic state if it is judged in the drive-standby state that a user is not present in a vicinity of the vehicle body for a predetermined time or longer; and
   the vehicle body is a saddle vehicle body on which a user rides in a straddling manner.

2. The electric vehicle according to claim 1, wherein the controller is configured or programmed to transition to the drive-standby state when the operator is operated in the basic state.

3. The electric vehicle according to claim 1, wherein the controller is configured or programmed to maintain the driving state during when the operator is being operated, and to transition to the drive-standby state if a non-operation of the operator is detected in the driving state.

4. The electric vehicle according to claim 1, wherein the controller is configured or programmed to judge, if a non-operation of the operator continues for the predetermined time or longer, that a user is not in the vicinity of the vehicle body for the predetermined time or longer.

5. The electric vehicle according to claim 1, further comprising a user detector that detects whether a user is present in the vicinity of the vehicle body; wherein
   the controller is configured or programmed to judge, if a state in which the user detector does not detect a user and there is no operation input to the operator continues for the predetermined time or longer, that a user is not in the vicinity of the vehicle body for the predetermined time or longer.

6. The electric vehicle according to claim 5, wherein the user detector includes a vehicle speed detector that detects whether the electric vehicle is running.

7. The electric vehicle according to claim 5, further comprising a human power drive system that transmits human power input by a user to the wheel; wherein
   the user detector includes a human power input detector that detects the input of the human power to the human power drive system.

8. The electric vehicle according to claim 1, further comprising an informer that informs the drive-standby state to a user.

9. The electric vehicle according to claim 8, wherein the informer includes a display supported on the vehicle body.

* * * * *